(12) United States Patent
Roy et al.

(10) Patent No.: US 7,191,139 B2
(45) Date of Patent: *Mar. 13, 2007

(54) SYSTEM FOR CATALOGING, INVENTORYING, SELECTING, MEASURING, VALUING AND MATCHING INTELLECTUAL CAPITAL AND SKILLS WITH A SKILL REQUIREMENT

(75) Inventors: Malcolm Roy, Destin, FL (US); Calvin Ward, Fort Walton Beach, FL (US); Robert Paul Reno, Fort Walton Beach, FL (US)

(73) Assignee: Mindloft Corporation, Plano, TX (US)

( * ) Notice: Subject to any disclaimer, the term of this patent is extended or adjusted under 35 U.S.C. 154(b) by 954 days.

This patent is subject to a terminal disclaimer.

(21) Appl. No.: 09/939,986

(22) Filed: Aug. 27, 2001

(65) Prior Publication Data

US 2002/0069080 A1  Jun. 6, 2002

Related U.S. Application Data

(63) Continuation-in-part of application No. 09/549,079, filed on Apr. 15, 2000.

(51) Int. Cl.
    *G06Q 99/00* (2006.01)
(52) U.S. Cl. .................... 705/1; 705/3; 705/7; 705/9; 705/10; 705/11; 705/31; 434/219
(58) Field of Classification Search ................ 705/1, 705/3, 5, 7–11; 707/3, 2, 102
    See application file for complete search history.

(56) References Cited

U.S. PATENT DOCUMENTS 5,164,897 A * 11/1992 Clark et al. ................ 705/1
5,197,004 A *  3/1993 Sobotka et al. ............. 705/8
5,416,694 A *  5/1995 Parrish et al. .............. 705/8

(Continued)

FOREIGN PATENT DOCUMENTS

WO    WO 99/39716    *  9/1998

(Continued)

OTHER PUBLICATIONS

Tapsell, Sherrill, "Making money from brainpower: The new wealth of nations", Jul. 1998, Management-Aucklan, v45n6, pp. 36-43.*
Greengard, Samuel, "Storing, Shaping and sharing collective wisdom", Oct. 1998, Workforce, v77n10 pp. 82-88.*
Tapsell, Sherrill, "Making money from brainpower: The new wealth of nations", Jul. 1998, Management-Aucklan, v45n6, pp. 36-43.*
Greengard, Samuel, "Storing, Shaping and sharing collective wisdom", Oct. 1998, Workforce, v77n10 pp. 82-88.*

*Primary Examiner*—John W. Hayes
*Assistant Examiner*—Freda A Nelson
(74) *Attorney, Agent, or Firm*—Frank A. Cona

(57) ABSTRACT

The present invention is directed to a system for cataloging, inventorying, selecting, measuring, valuing and matching Intellectual Capital skills and matching or inquiring of an individual's skills, and particularly to a system for finding candidates for an employment or consulting position having requisite skills, and more particularly to a system for creating a searchable knowledge base of individuals skills indexed in a hierarchical cataloging, measuring and valuation system. The present invention includes generating a list of Intellectual Capital Codes based upon a standardized skills catalog which contains a set of skill categories organized in a hierarchical manner with a unique Intellectual Capital code and at least one weighting factor assigned to each skill, wherein a plurality of Intellectual Capital codes and weighting factors can be compared to determine a match.

44 Claims, 9 Drawing Sheets

U.S. PATENT DOCUMENTS

| | | | |
|---|---|---|---|
| 5,566,333 A * | 10/1996 | Olson et al. | 707/102 |
| 5,924,072 A * | 7/1999 | Havens | 705/1 |
| 5,974,407 A * | 10/1999 | Sacks | 707/2 |
| 6,070,143 A * | 5/2000 | Barney et al. | 705/8 |
| 6,266,659 B1 * | 7/2001 | Nadkarni | 707/3 |
| 6,272,467 B1 * | 8/2001 | Durand et al. | 705/1 |
| 6,275,812 B1 * | 8/2001 | Haq et al. | 705/11 |
| 6,411,936 B1 * | 6/2002 | Sanders | 705/10 |
| 6,873,964 B1 * | 3/2005 | Williams et al. | 705/9 |

FOREIGN PATENT DOCUMENTS

| | | | |
|---|---|---|---|
| WO | WO 99/54835 | * | 10/1999 |

* cited by examiner

Fields marked in red are required.

[] ClientName Job

SkillMatch

| Title | Title | | |
|---|---|---|---|
| Client Contact | LAST NAME, FIRST NAME - TITLE | Current Status | Inactive |
| Fill By Date | Apr 14 2000 | Salary Type | Yearly |
| State | FL | Travel | 20 % |
| Salary From | $8,000.00 | Salary To | $8,000.00 |
| Description | Description | | |
| Internal Notes | | | |

Edit

Edit Skills

Current Skills Listed

Application Software/Database/File Based/
 -Access      Years Used: 1, Last Used:1999, C U P I D
 -FoxPro      Years Used: 1, Last Used:1999, C U P I D
 -Paradox     Years Used: 1, Last Used:1999, C U P I D
Application Software/Database/Server Based/
 -Clipper     Years Used: 1, Last Used:1999, C U P I D
 -Dbase       Years Used: 1, Last Used:1999, C U P I D

*Figure 3(a)*

The following skills for Title – ClientName are MATCHED by First Name Last Name (3)

Application Software/Database/File Based/
  -Access
    Years Used: 1<2, Last Used: 1999=1999, CUPID/OOOIO
  -Paradox
    Years Used: 1<5, Last Used: 1999=1999, CUPID/COOOO
Application Software/Database/Server Based/
  -Dbase
    Years Used: 1=1, Last Used: 1999=1999, CUPID/OOPOO

The following skills for Title – ClientName are NOT MATCHED by First Name Last Name (7)

Application Software/Database/File Based/
  -FoxPro Last Used: 1999 Years Used: 1/CUPID
Application Software/Database/Server Based/
  -Clipper Last Used: 1999 Years Used: 1/CUPID
  -ESS Base Last Used: 2000 Years Used: 1/CUPID
  -SQL Server Last Used: 1999 Years Used: 1/CUPID
Application Software/Email/Client/
  -Eudora Last Used: 1999 Years Used: 1/CUPID
  -Outlook Last Used: 1999 Years Used: 1/CUPID
Application Software/Email/Server/
  -Exchange Last Used: 1999 Years Used: 1/CUPID

First Name Last Name has the following skills NOT REQUIRED by Title – ClientName (1)

Application Software/Database/Server Based/
  -Informix Last Used: 1996 Years Used: 5/COOOD

| Title – ClientName | | First Name Last Name – Title | |
|---|---|---|---|
| FIRST NAME LAST NAME<br>Work Phone<br>EMAIL | | Contact<br>Information | First Name Last Name<br>Phone Home<br>Email |

*Figure 3(c)*

SYSTEM FOR CATALOGING, INVENTORYING, SELECTING, MEASURING, VALUING AND MATCHING INTELLECTUAL CAPITAL AND SKILLS WITH A SKILL REQUIREMENT

CROSS-REFERENCE TO RELATED APPLICATION

This application is a continuation-in part of co-pending application Ser. No. 09/549,079, filed Apr. 15, 2000.

STATEMENT REGARDING FEDERALLY SPONSORED RESEARCH

Not applicable.

REFERENCE TO MICROFICHE APPENDIX

Not applicable.

BACKGROUND OF THE INVENTION

1. Field of the Invention

The present invention relates to an improved system for the cataloging, inventorying, selecting, measuring, valuing and matching Intellectual Capital, and matching or inquiring of an individual's skills, and particularly to a system for finding candidates for an employment or consulting position having requisite skills, and more particularly to a system for creating a searchable knowledge base of individuals skills indexed in a hierarchical cataloging, measuring and valuation system.

2. Description of the Prior Art

Historically, businesses have been forced to base the valuation of human skills (or "Intellectual Capital") of individuals, whether for employment, training, or acquisition purposes, solely on past performance and education. Intellectual Capital has been defined many ways, but two of the more common definitions are 1) that Intellectual Capital is knowledge that can be converted into value, and 2) that Intellectual Capital is intellectual material that has been formalized, captured and leveraged to produce a higher-valued asset.

The terms "Intellectual Capital" and skills are often used interchangeably. However, it is important to note that skills (the knowledge that an individual has that they can apply to a task that is of value to an employer) are really just one part of the intangible assets encompassed by Intellectual Capital, which can also include patents, business relationships and customer relationships, for example.

Because knowledge and intellectual material are derived from human resources, one of the major tasks of Intellectual Capital managers is to transform human resources into intellectual assets. In the systems of the prior art, determining the Intellectual Capital of current employees or employment candidates has been inefficient, cumbersome and imprecise, often relying on subjective written skill descriptions that do not use any uniform, consistent or regulated terminology, which would allow for an accurate and systematic search and result in an unbiased and equitable comparison of candidate skills.

For example, an electronic search for employment candidates in this manner has typically been accomplished in the prior art by utilizing a database of candidate resumes, wherein the text of each resume is indexed in the database and is searched through a user interface. Because candidate resumes contain subjective written descriptions of the candidate's Intellectual Capital that can vary widely in terminology, standard key word searching of these databases to match a candidate's skills with the requirements of the position in question is inefficient and imprecise.

As the world moves into the information age, Intellectual Capital has become paramount in determining the future success of businesses wishing to participate in the "new economy." The inability to capitalize on a company's Intellectual Capital, however, lies in its inability to measure it in any meaningful sense.

Accordingly, a workable and efficient system is needed for inventorying, measuring, and valuing an individual's Intellectual Capital, and to create a uniform inventory of Intellectual Capital that accurately embodies the relative value of that individual's Intellectual Capital in a particular situation.

SUMMARY OF THE INVENTION

The present invention is directed to a method and apparatus for cataloging, inventorying, selecting, measuring, valuing and matching Intellectual Capital skills and matching or inquiring of an individual's skills, and particularly to a system for finding candidates for an employment or consulting position having requisite skills, and more particularly to a system for creating a searchable knowledge base of individuals skills indexed in a hierarchical cataloging, measuring and valuation system.

The system of the present invention may include establishing a hierarchical list of defined skills, wherein a portion of each of the defined skill is reflected in each level of said hierarchical list; assigning an alphanumeric symbol to each of the defined skills to create an Intellectual Capital code for the defined skill; receiving a set of submitted skills, wherein the set of submitted skills contains at least one of the defined skills in the hierarchical list; identifying the Intellectual Capital code corresponding to the defined skill in the set of submitted skills; adding at least one weighting factor to at least one of the identified Intellectual Capital codes; and storing the identified Intellectual Capital codes and the weighting factors for the skill set in a data source. The set of submitted skills may comprise an individual skills inventory or a position requirement set for a job position.

BRIEF DESCRIPTION OF THE DRAWINGS

FIGS. 2(a)–(e) are a series of computer screen shots of input forms submitted by a prospect using a preferred embodiment of the present invention.

FIGS. 3(a)–(c) are a computer screen shots of results screens retrieved by a prospect using a preferred embodiment of the present invention.

DETAILED DESCRIPTION OF THE PREFERRED EMBODIMENT

Figure 1:
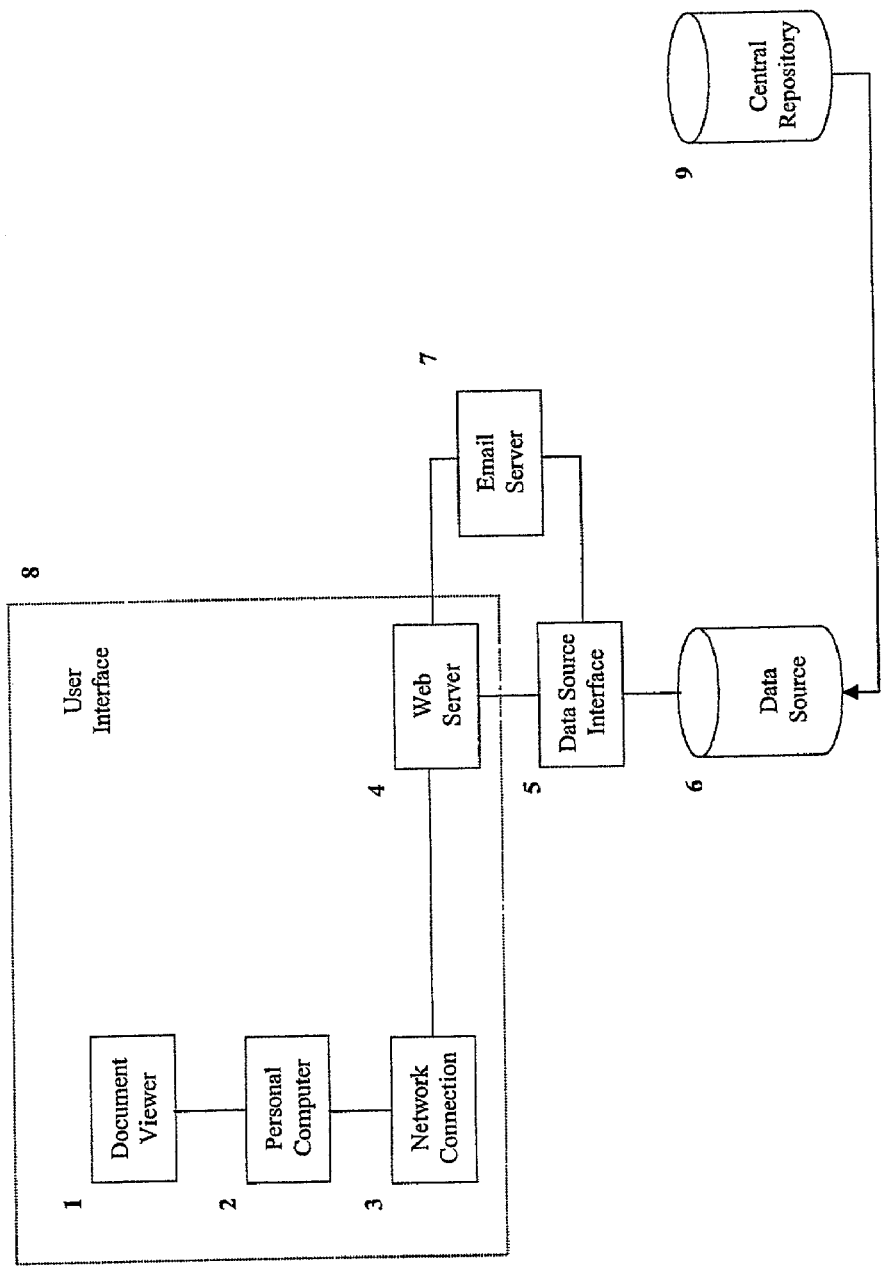
FIG. 1 is a block diagram illustrating a preferred embodiment of the present invention used over the Internet.

The present invention will be understood more fully from the detailed description given below and from the accompanying drawings of preferred embodiments of the invention, which, however, should not be taken to limit the invention to a specific embodiment but are for explanation and understanding only.

In accordance with the present invention, the first step in the effective utilization of Intellectual Capital is its measurement and identification. In order to properly inventory an individual's skills or other Intellectual Capital, a hierarchical skill cataloging system provides the most portability and is preferred. In accordance with aspects of the present invention, the skills catalog contains a hierarchical list of defined skills that will preferably consist of five levels, although more or less levels can be used. The preferred names for these five levels are CLASS, KNOWLEDGE GROUP, SKILL GROUP, SKILL SET, and SKILLS. These names are not meant to be exclusive or inclusive, but to be illustrative of the hierarchical nature of the categories on each level. In this fashion, codes may be determined for each category within each level and from which a combination of codes from the different levels will result in an Intellectual Capital Code for a given defined skill.

One possible breakdown of this hierarchy is shown in Table 1:

TABLE 1

| Hierarchical Levels: | Hierarchical Level Code: |
|---|---|
| Level 1: CLASS | |
| Category 1: IT (Information Technology) | 01 |
| Category 2: | |
| Level 2: KNOWLEDGE GROUP | |
| Category 1: Application Software | 09 |
| Category 2: | |
| Level 3: SKILL GROUP | |
| Category 1: eMail | 55 |
| Category 2: | |
| Level 4: SKILL SET | |
| Category 1: Server | 021 |
| Category 2: | |
| Level 5: SKILLS | |
| Category 1: iMail | 233 |
| Category 2: | |

Each category in this representative hierarchy is described in more detail below: The CLASS category is used to denote an industry as a general rule, though not limited thereto; it is a logical grouping. Skills that are directly related to people management, for example, may first be defined by a CLASS outside of any specific industry. For example, skills can usually be defined in the hierarchical list at this level by something broad reaching such as Information Technology, Aerospace, Medical, Soft Skills, etc.

The KNOWLEDGE GROUP, SKILL GROUP, AND SKILL SET categories are logical hierarchal divisions to work down from the CLASS grouping. These divisions may vary depending on the level above it. For example, they may divide languages and software, leadership and teamwork, modules from other modules. It is truly dependent upon the CLASS to which they belong.

Thus one possible way to define skills in the catalog is as shown in Table 2.

TABLE 2

| Class | Information Technology | |
|---|---|---|
| Knowledge Group | Application Software | Hardware |
| Skill Group | Operating Systems | Networking |
| Skill Set | Client | Routers |
| Skills | Microsoft Windows 95/98 | Cisco 1600 Series |

The SKILLS category includes the final portion of the skill being defined. This is typically the most difficult and the most important aspect of the hierarchical list to determine. The defined skill may be derived from whatever an employer would need to know specifically about an individual's knowledge in a given area. Essentially, any individual criteria that would appear on a resume or job requirement as a reason for hiring, and is not simply education or formal recognition of a skill, can become a defined skill in the hierarchical list and would be listed in the SKILL category.

In the preferred embodiment of the present invention, a particular skill will not be designated in the list within another skill. For example, if an employer wishes to find a programmer who understands Microsoft Outlook, they might need to select one or more defined skills from the hierarchical list (discussed in more detail below), such as /../Visual Basic and /../Microsoft Outlook 2000. Some examples of skills that can be used to create defined skills are shown in Table 3.

TABLE 3

Software:

Microsoft Internet Explorer 5.5
Adobe Photoshop 5.5
Development Languages:

C ++
HTML
Languages

Spanish
Russian
Parts of a software product:

Contract Management Module of JDE Edwards
Team Development Sub Module of SAP
Hardware Dell PowerEdge Servers
Cisco 1600 Routers
People Skills Group Training
One on One Training
Oral Communication
Written Communication In the hierarchy previously described, no one level usually defines a skill. To truly understand what a skill is, one has to know each level being used to select that defined skill from the hierarchical list. In other words, a skill is selected by combining each level of the hierarchy corresponding to the requirements designated to define that skill. For example, "Information Technology/Application Software/Operating Systems/Client" would not a be defined skill if each level of the hierarchy were required to be matched against the skills submitted by the user, since it does not include the specific skill listed in the SKILL level of the hierarchy. Alternatively, in this scenario, "Information Technology/Application Software/Operating Systems/Client/Microsoft Windows 95/98" would a defined skill because it completely describes the skill.

When dealing with software in particular, the version number of an application may be defined as a separate skill, such as when a new version is sufficient changed from the last to warrant a separate listing. For example, Microsoft Windows 3.11 is significantly different than Microsoft Windows 95, while the differences from Windows 95 to Windows 98 are less dramatic.

Software manufacturers or vendors are preferably not used to define skills on one of the levels due to the fluid nature of such industries. Instead, it is preferred that logical groupings are used based on usage or purpose of the skills.

The combination of the information for a defined skill from each above-described levels is used to create an Intellectual Capital code for that defined skill: Class—Knowledge Group—Skill Group—Skill Set—Skill. This code is represented by the elements in Table 2, for example, as: Information—Application Software—Operating Systems—Client—Windows 95/98. The Intellectual Capital code is preferably stored as a series of alphanumeric characters. For example, in a preferred embodiment of the present invention, these codes may be used to create a code such as "01-09-55-021-233". The format of this number may be standardized for use in multiple applications. It will be readily apparent to those of ordinary skill in the art that a variety of numbering schemes can be employed, such as decimal, hexadecimal, octal, etc.

Because it is often important to distinguish among the relative experience of individuals having a skill, and not simply to determine if the individual possesses that particular skill, the present invention also provides a way to weight a defined skill identified by the aforementioned Intellectual Capital code. In other words, the weighted Intellectual Capital Code may be determined, for example, by how an employer wants to determine the depth of knowledge to measure an individual's skill. The weighted Intellectual Capital code is used to measure how well someone knows a given skill. It separates experience (how or where a skill is used or with what other skills) from knowledge (how well a skill is known).

For example, this measurement might include: "Last Year Used", as well as "Number of Years Used as User ", "Number of Years Used as Planner", "Number of Years Used as Developer", as "Number of Years Used as Implementer" and "Number of Years Used as Certified". Other examples are shown in Table 4.

TABLE 4

Software:

Years Used
Last Used
Use
Configure
Development Languages:

Years Used
Last Used
Languages

Years Used
Last Used
Speak
Read
Write
Parts of a software product:

Years Used
Last Used
Use
Configure
Hardware

Years Used
Last Used
Configure
Use
People Skills

Years Used
Last Used

One of the great difficulties in measuring Intellectual Capital is having a realistic, but objective means to gauge ability. The addition of a weighting factor provides significant benefits over the prior art in that most skills can be accurately and objectively weighted by how long they have been used, and when they were last used. Knowing how many years a skill was used is a less subjective measurement of knowledge than Expert/Beginner or a numeric scale. This is based upon the understanding that the more years a skill is used the more proficient the individual becomes in that skill, and that the further back in time that a skill was last used, the less proficient the individual typically is in that skill.

In the preferred embodiment of the present invention, the weighting factor is limited to five values, with Years Used and Last Used being used with all defined skills. This would allow for three other, configurable weighting values for each defined skill, to be based, for example, on what an employer would want to know about a skill. In conjunction with this, a total of nine digits are preferably used for the weighting factor. The Last Used would occupy four digits, and the Years Used would occupy two digits.

The remainder of the weighting factors may use single On/Off values. For example, either an individual can Use and/or Configure Outlook 2000 or they cannot. There would be no degrees of ability such as Beginner/Intermediate/Advanced, since that would be far too subjective and not useful for measurement.

If less than three weighting values are used (in addition to the Last Used and the Years Used), then the missing values may be represented in the data source by a 0 value. Visually this may be represented by an underscore (_), just like lack of that measurement would be. The provides the advantage that a uniform defined length of the Intellectual Capital code can be maintained, to ensure compatibility with numerous other processes and technology.

Thus, for example, an individual may have the particular defined skill shown in Table 5, and the following experience: Years Used: 5; Last Used: 1999; Use: Yes; and Configure: Yes The resulting weighted Intellectual Capital code for the defined skill might look like: "01-04-01-001-001:199905/UC_". Those of ordinary skill in the art will appreciate, of course, that the defined skill related information is not necessarily stored in the data source in this fashion, but that it is merely presented this way for readability purposes. This skill could be verbalized as "Joe has used and configured Microsoft Windows 95/98 for 5 years until 1999."

TABLE 5

| Class | Information Technology | 01 |
| Knowledge Group | Application Software | 04 |
| Skill Group | Operating Systems | 01 |
| Skill Set | Client | 001 |
| Skills | Microsoft Windows 95/98 | 001 |

The Intellectual Capital code may also have an additional value, referred to as MUST or PLUS or ANY. An Intellectual Capital code incorporating this value might be: "01-04-01-001-001:199905/UC_M ". The use of the MUST or PLUS or ANY allows recruiters, clients, and employers to determine which skills are more or less relevant in a given set of position requirements, and which are more or less important to any decision process. The ANY value allows those searching for candidates to search for someone with any one of these skills.

Moreover, a total dollar value of an individual's Intellectual Capital could also be determined by valuing each the Intellectual Capital codes (weighted or unweighted) identified as belonging to defined skills for that individual. For example, the Intellectual Capital code noted above might include a monetary value element: "01-04-01-001-001: 199905/UC_/D00". In other words, dollar values may be placed upon each of the measured skills.

For example, it may be determined that value of a particular defined skill associated with the "Last Year Used" drops by $80 per year for each year prior to the present. And, for each Year Used the value of that defined skill increases by $120. Being a User of that defined skill adds $20. And, being a Planner of that defined skill adds $60. Being a Developer of that defined skill adds $50. Being an Implementer of that defined skill adds $40. Being Certified in that defined skill adds $50, and that the defined skill itself may be worth $200. Combining these together, the value of the Intellectual Capital Codes for these defined skills is $510.

The above-described Intellectual Capital codes can be thus be used to create an inventory of skills for each individual, which would be comprised of all of the Intellectual capital codes that represent the defined skills belonging to that individual. The Intellectual Capital codes can also be used to create a set of position requirements for a job position, or a set of criteria generally to be used by employers looking for a particular type of candidate.

This allows for the creation of a catalog of skills, categories and codes, and the implementation of a uniform method of measuring and applying values to an inventory of Intellectual Capital codes created using the skills catalog, which may be stored in a data source. The data source of the present invention may comprise any number of data sources well known to those of skill in the art, such as relational databases or linked files.

Moreover, the standardization of the aforementioned catalog and methods could be regulated through an independent body, to allow transportability of this catalog and methods (or appropriate portions thereof) to different applications where the valuation of Intellectual Capital is necessary. A remote, central repository of the codes could then exist, allowing any business to be able to determine the value of the Intellectual Capital in their organization, and that determination would have meaning to anyone else having knowledge of the coding system.

In addition, in one preferred embodiment of the present invention, a recruiting business can also directly match the skills needed by a job opening to skills that a job seeker holds. The business will further be able to evaluate on that match utilizing the aforementioned valuation technique to significantly decrease the decision making time required by a recruiter in determining the value of a match.

A set of skills for an individual or a job position may be submitted and entered into the data source using a series of drill down forms, such as HTML forms incorporating drop-down boxes, keyword searches, and questions. For example, a user may tell the system, 'I'd like Information Technology." The system will offer Application Software and other Knowledge Groups. Then the user might choose Application Software and the system might then offer further choices, until they reach the level of the skill itself, although this would not necessarily be required. The operation of the system of the present invention is described in more detail below.

This method provides the significant advantage that it doesn't require the user to "recall" specific skills; the choices themselves will remind the user of things he may have forgotten. To minimize the number of steps involved in this process and the need to use specific key terms, the present invention may also incorporate previews of the next catalog level, and the ability to search for a specific skill or catalog level.

Also, because two people with the same skill may refer to that skill with different names, the present invention may also incorporate a system to alias or map related terms when identifying a defined skill. This may be accomplished, for example, by applying alternate names elements in each of the catalog levels, thus allowing a search to result in the exact results needed to quickly locate the requested items. The present invention may further incorporate a natural Language engine that will ask questions and prompt the user to select skills and choices based on the questions asked. Such systems are well known to those of ordinary skill in the art.

As noted above, the present invention provides the distinct advantage that it allows those looking for candidates to shift their focus from an inexact job title to focusing on specific (defined) skills. For example, a conversation about job needs typically begins with statements such as "I need a Programmer or I need a Project Manager." However, the statement should more properly be phrased as: "I need somebody who knows C++, Perl, HTML, Visual Basic" or "I need someone who knows SAP, Training, Motivation, etc." In other words, the employer is saying, "I'd like to hire a Project Manager who managed a project using SAP."

This exemplifies the importance of measuring experience (where and with what other skills a skill was used) in a quantifiable manner. The present invention provides a means to answer this question by creating a Skill Binding based on experience. Moreover, the Skill Binding can be incorporated into both an individual's inventory of Intellectual Capital codes and an employer's set of position requirements. This greatly increases the accuracy of the matching process of the present invention, described in more detail below.

When determining an individual's skill inventory, the system of the present invention may ask a series of questions such as: "Where did you work?"; "What Skills did you use?"; followed by, "Where did you work before that?"; "What Skills from the first job did you use?"; "What additional Skills did you use?"; and then finally, "What other skills do you have that you haven't listed yet?" Each time two or more Skills are used in single Job, they are marked with a Skill Bind and are stored in the data source. In a similar manner, when creating a set of position requirements, the system may ask (after all skills are entered into the system): "which of these skills do you want the individual to have used in the same environment, or used together?"

The visual representation of Skill Bind may be accomplished simply by inserting a two-digit value to the end of the Intellectual Capital code, preferably before any weighting factor. For example, an unbound representation of the defined skill for Microsoft Windows 95/98 is: "01-04-01-001-001:00/199905/UC$_{13}$ ". This same defined skill, bound with some other defined skills now in an individual's Intellectual Capital inventory, would be:

01-04-01-001-001:01/199905/UC_
01-04-01-032-051:01/200002/_C_
01-04-02-201-084:00/199905/UC_
01-04-96-071-010:01/200002/U_

The process of submitting a set of skills to the system of the present invention in its simplest form will involve a business posting the skills it needs for a particular job, and a job seeker posting the skills they have. Both entities will also post other relevant information such as contact information, relocation, travel, training, education, etc.

The user will be able to select skills using a standard drill down multi-screen elimination process, such as in a sequence of Web forms as discussed in more detail below, or the user will be able to quickly search each selected hierarchy level name and associated keywords to get a list of appropriate skills. Utilizing this list, the user may also select multiple skills. On the final skill selection screen, the user will be able to enter the measurement characteristics for each skill to create a skills inventory for an individual or a skills requirement set for a position.

An individual's skills inventory (as embodied in his individual Intellectual Capital codes) may be entered using a variation of the above process, derived from the Intellectual Capital codes contained in the aforementioned skill catalog. In addition, the skills requirements of a job may also be entered using a variation of the above process, derived also from the codes contained in the skill catalog, creating the position requirement set.

Then a comparison or match of the skills inventory of various individuals with the position requirement set will reveal the number of matching skills. The matching system of the present invention may also use the weighting factor to allow, for example, early disqualification of candidates for a specific job, and allow zeroing in on properly qualified candidates based upon the candidate's skills inventory as compared with the position skills requirement. The results can then be displayed by various means well known to those skilled in the art to the user, based on the weighting or other criteria.

Thus, once an employer has created the skills requirement set for a position, that employer can then perform a match against the skills inventory of any available individuals to determine if those individuals meet the employer's requirements.

The present invention provides the distinct advantage that it significantly reduces the time it takes to determine a match, without eliminating important subjective decision making. For example, an employer can determine that although an individual can currently only Use a skill, the employer can teach him to Configure as well, since he at least knows the skill. In other words, the present invention matches and presents the individual's skills inventory in a manner that still allows the employer to make subjective determinations.

In the preferred embodiment, the matching process works by first matching the base Intellectual Capital codes (i.e., devoid of weighting factors and other additional values). When these Codes match, the system may then evaluate the Skill Bind needs of the position requirement set to the Skill Bind associations of the individual's skills inventory.

If a particular skill in the individual's skills inventory is not Skill Bound, but is Skill Bound in the position requirement set, then it is preferred that the weighted value of that Skill be reduced by 50% in the comparison. This is based on the understanding that the intentional binding of skills in the position requirement set is highly important, yet allows for a subjective decision to still be made by the employer, by including the individual's skills in the result set.

Next, the various weighting factors may also be compared. For example, skills weighted with the MUST value in the position requirement set are separated from the PLUS weighted skills. Thereafter there may be two sets of comparisons based upon these weighting values.

In these comparisons, the ANY value is exclusive of the MUST and PLUS. Thus, if the individual's skills inventory contains a skill identified in the position requirement set with the ANY value, then it is treated as a MUST. If no ANY valued Skills are matched, then the comparison will reflect a 100% loss for that skill. In other words, if the position requirement set contains four skills containing the MUST value and four containing the ANY value, and the skill inventory for that individual has all four of the MUST skills, but none of the ANY then the actual match would be a 80%.

In addition, if a particular skill does not contain an On / Off weighting value that is specified by that skill in the position requirement set, then the weighting of the resulting comparison may also be reduced by some amount, for example, 10%.

In another matching scenario, if the skill in the individual's skills inventory is valued at one year less in Years Used (or Last Used) than the same skill in the position requirement set, the value of that comparison may be reduced, preferably from 1% to 10%. If the year is one year greater, the value may be increased by a similar amount. This increase in value may also be limited to situations when the skill in the position requirement set fully matches the On/Off values associated with that skill in the individual's skill inventory.

Finally, if any skill yields a matching value of less than 90% in a comparison, then the matching value percentage won't reflect any bonuses. In other words, unless an individual's skills match all of the position requirements, no bonuses will be applied to the comparison of the particular skills.

All of the matching individual skills inventories are then sorted by the value of the comparison percentages for the skills contained in each. This is preferably sorted on the MUST value match percentage first, and then the PLUS matching percentage, although not limited thereto.

In operation, this may occur as follows. The position requirement set may contain the following Intellectual Capital codes:

01-04-01-001-001:01/199905/UC_M
01-04-01-032-051:01/200002/_C_M
01-04-02-201-084:00/199905/UC_M
01-04-96-071-010:01/200002/U_M
01-04-96-071-011:01/200002/U_M

A particular individual may have an individual skills inventory comprising the following Intellectual Capital codes:

01-04-01-001-001:01/199905/UC__
01-04-01-032-051:01/200002/_C__
01-04-02-201-084:00/199905/UC__
01-04-96-071-010:01/200002/U__
01-04-96-071-011:01/200002/U_

The system of the present invention would then compare these sets of skills to determine if there is a match and the value of the MUST and PLUS comparisons of each skill in the set. In this example, there is a 100%/100% match, where the first percent is the MUST comparison, and the second percent is the PLUS comparison.

In a second example, the position requirement set comprises:

01-04-01-001-001:01/199905/UC_M
01-04-01-032-051:01/200002/_C_M
01-04-02-201-084:00/199905/UC_M
01-04-96-071-010:01/200002/U_M
01-04-96-071-011:01/200002/U_M

The individual skill inventory comprises:

01-04-01-001-001:01/199905/U__
01-04-01-032-051:01/200002/__
01-04-02-201-084:00/199905/U__

01-04-96-071-010:01/200002/U_
01-04-96-071-011:01/200002/U_

In this situation, there is a 94%/100% match, since three of the skills in the individual skill inventory are missing the C value contained in the corresponding skills in the position requirement set.

In a third example, the position requirement set comprises:
01-04-01-001-001:01/199905/UC_M
01-04-01-032-051:01/200002/_C_M
01-04-02-201-084:00/199905/UC_M
01-04-96-071-010:01/200002/U_P
01-04-96-071-011:01/200002/U_P The individual's skill inventory comprises:
01-04-01-001-001:01/199905/U_
01-04-01-032-051:01/200002/_
01-04-02-201-084:00/199905/U_
01-04-96-071-010:01/199802/U_
01-04-96-071-011:01/199902/U_

This example produces a 90%/98.5% match, since the same C values are still missing, but now there are three skills in the individual skills inventory that match the skills in the position requirement set containing the MUST value.

In a fourth example, the position requirement set comprises:
01-04-01-001-001:01/199905/UC_M
01-04-01-032-051:01/200002/_C_M
01-04-02-201-084:00/199905/UC_M
01-04-96-071-010:01/200002/U_P
01-04-96-071-011:01/200002/U_P The individual skill inventory comprises:
01-04-01-001-001:01/199901/U_
01-04-02-201-084:00/199905/U_
01-04-96-071-010:01/200002/U_
01-04-96-071-011:01/200010/U_

This produces a 58.6%/108% match, since one of the skills containing a MUST value is missing, and the value of Years Used in the skills in the position requirement set that contain the PLUS value exceed the value of Years Used in the corresponding skills in the individual skill inventory.

Upon finding prospective job seekers, the user will be able to compare side by side the skills that match and the relationship of the measurements of each skill, e.g. greater or less than the requirements. The user will also be shown the skills that the job seeker lacks and the skills that the job seeker has that the job doesn't require. The user will also be able to view other non-skill related comparisons such as relocation, travel, etc.

Some of the many significant uses of the present invention, which are not capable with the systems of the prior art, are, matching jobs, measuring the Intellectual Capital value of a business, and evaluating training needs. It will also be appreciated to one skilled in the art that the system of the present invention could easily be utilized in a number of additional areas.

FIG. 1 is a schematic demonstrating the typical components used in a preferred embodiment of the invention when used over the Internet. Those of ordinary skill in the art will appreciate that the present invention, while described below in connection with its use over the Internet, is certainly not limited thereto.

An electronic document, such as a Web page created using HTML, is loaded into Document Viewer 1. Document Viewer 1 may be any software application capable of viewing electronic documents and loading additional electronic documents from within the original document, such as through the use of a hypertext link or form (although not limited thereto).

For example, the Document Viewer could include a Web browser, such as Navigator from Netscape Communications or Microsoft's Internet Explorer. The electronic document may be loaded automatically when Document Viewer 1 is first started, or may be opened into the lo viewer by the user from a file stored locally or at a remote address. For example, the user may load the document by typing the document's address into the Web browser's command line.

Document Viewer 1 may be accessed by the user through any of a number of computer systems, such as through the use of a terminal connected to a mainframe system, from a personal computer, or over computer connected to a local computer network.

Document Viewer 1 is connected to the Internet along with Personal Computer 2, through Network Connection 3. This connection is typically made through local telephone lines using an analog, ISDN, or DSL connection, though it can be over a direct network connection, such as an Ethernet network and leased line. Network Connection 3 may be a computer network that routes any requests from Document Viewer 1 to the appropriate location on the Internet. This operation is well known to those of skill in the art. Network Connection 3 connects Document Viewer 1 to Web Server 4 through any of a number of well-known connection schemes, such as through the use of leased lines. This combination essentially comprises User Interface 8 in this particular preferred embodiment of the invention.

Web Server 4 is typically a software application running on a remote computer that is capable of forwarding or processing requests from Document Viewer 1. For example, Web Server 4 may include any one of a number of well-known server applications, such as the NSCA Web server, the Apache Web server, etc. Web Server 4 passes a document request from Document Viewer 1 to Data Source Interface 5 for accessing Data Source 6. Data Source 6 contains the complete hierarchical list of Intellectual Capital codes, and the information on each individual, job opening, etc.

After a document, such as an HTML form (or series of forms), is loaded into Document Viewer 1, the user enters in the appropriate information and activates a hypertext link or form "Submit" button, generating a signal back to Data Source Interface 5. This is preferably in the form of an HTTP request sent over the Internet using TCP/IP and possibly a Secure Socket Layer ("SSL"). The request may be routed through Network Connection 3 and through Web Server 4 to Data Source Interface 5. It will be appreciated that the details of HTTP operation in conjunction with TCP/IP and SSL are well known to those of ordinary skill in the art and will, therefore, not be elaborated on here.

When the HTTP request is received by Data Source Interface 5, it accesses Data Source 6 to retrieve the requested information based upon the signal from Document Viewer 1. In one embodiment of the invention, a common gateway interface ("CGI") program, well known to those of skill in the art, may be used to parse the data from Document Viewer 1. This program acts as an interface between the Web Server 4 and/or Data Interface 5 and Data Source 6 by executing a set of instructions. The interaction of Web servers and CGI programs and the sending of information between them is well known to those of ordinary skill in the art.

The CGI program may extract the document information from the information passed to it by the server and retrieve the appropriate information from Data Source 6. This may be accomplished in a number of ways known to those of ordinary skill in the art. For example, if the CGI program is a PER1 script or other API, a database access module can be used to interface with the majority of commercial relational database applications. Examples of such databases include Oracle, Sybase, SQL Server, and the like. It is also possible for these systems to be accessed directly by Web Server 4 using their own internal data engines.

Information is submitted to or extracted from Data Source 6, depending on the signal sent by the Document Viewer 1. Data Source Interface 5 then generates a signal back to Document Viewer 1 through Web Server 4.

The system of the present invention may preferably be used by at least five types of users: a prospect, a client, a recruiter, a system manager, and the system administrator. It will be appreciated, however, that the present invention is not limited thereto and may include any users desiring to catalog, inventory, select, measure, value or match Intellectual Capital, or match or inquire as to an individual's particular skills.

Figure 2A:
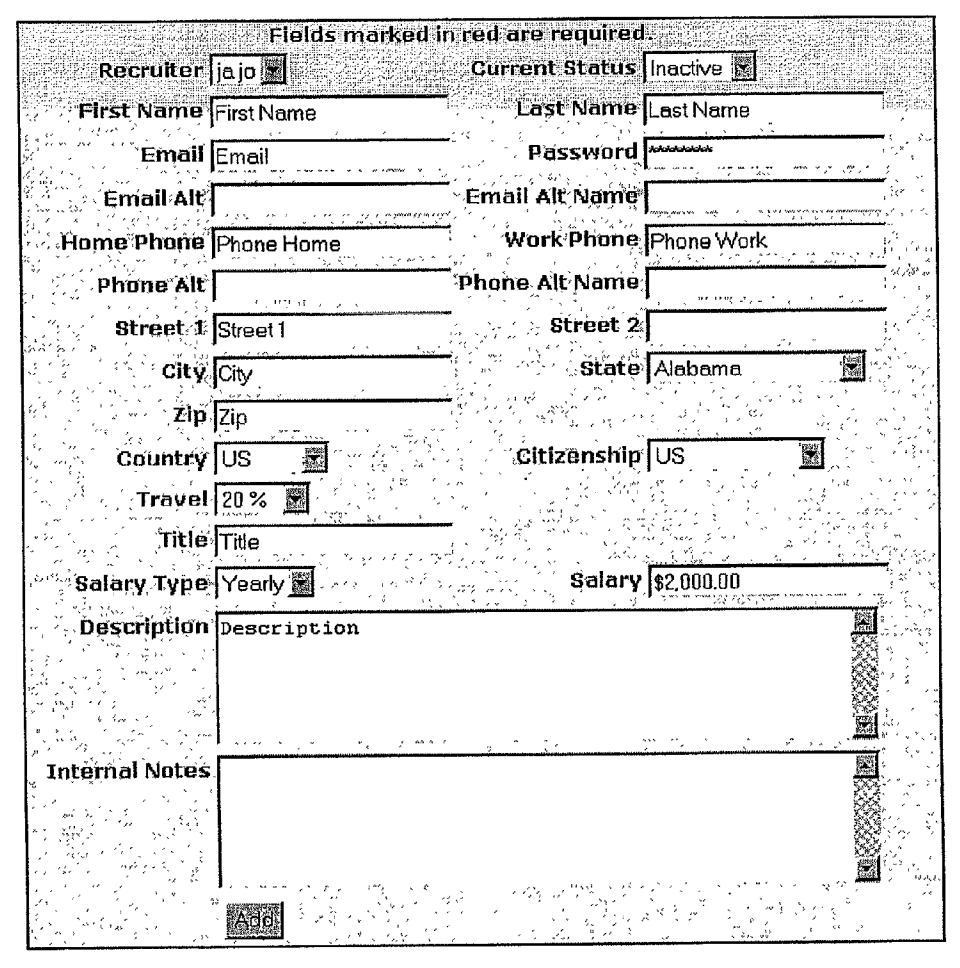
Figure 2B:
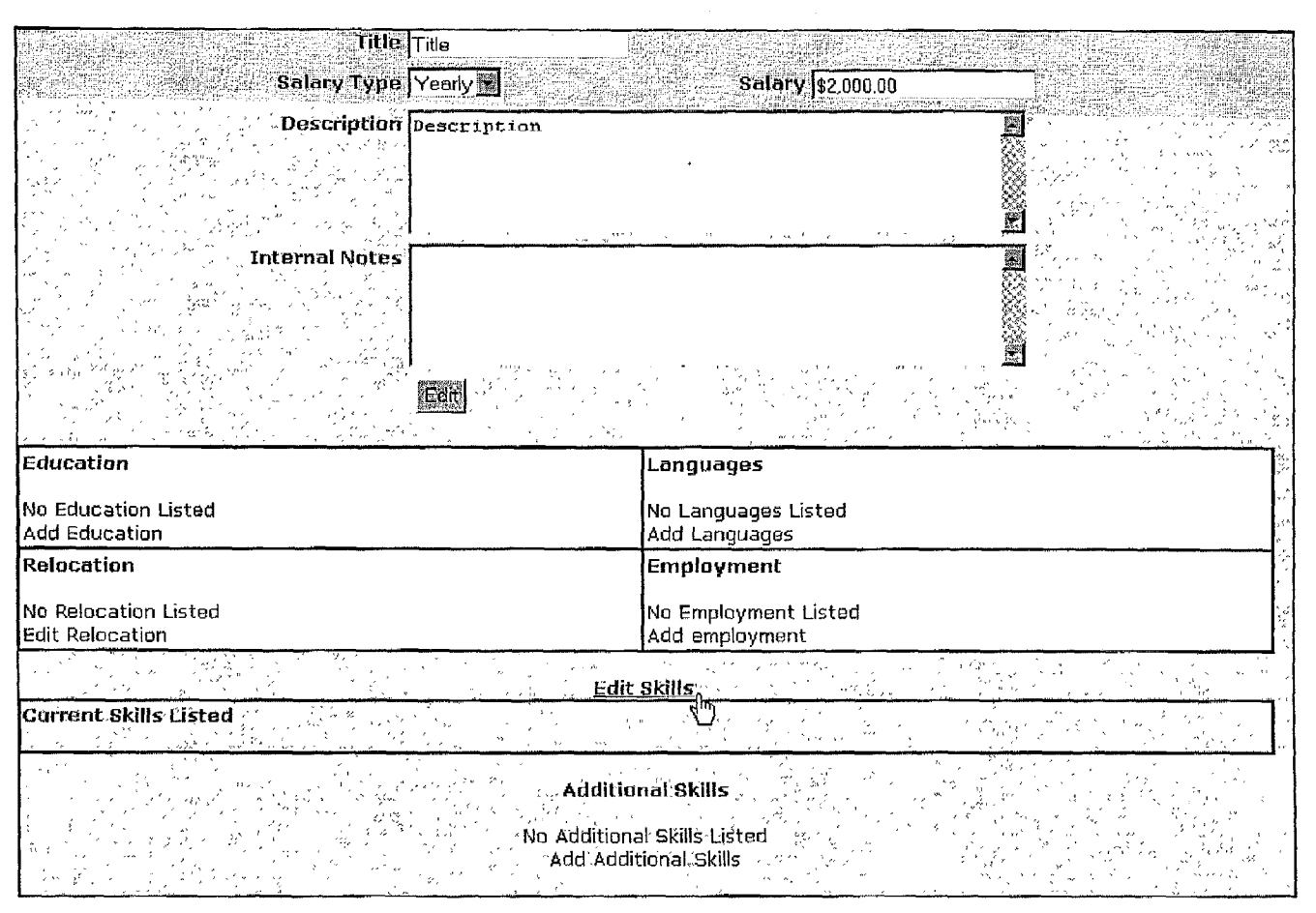
Figure 2C:
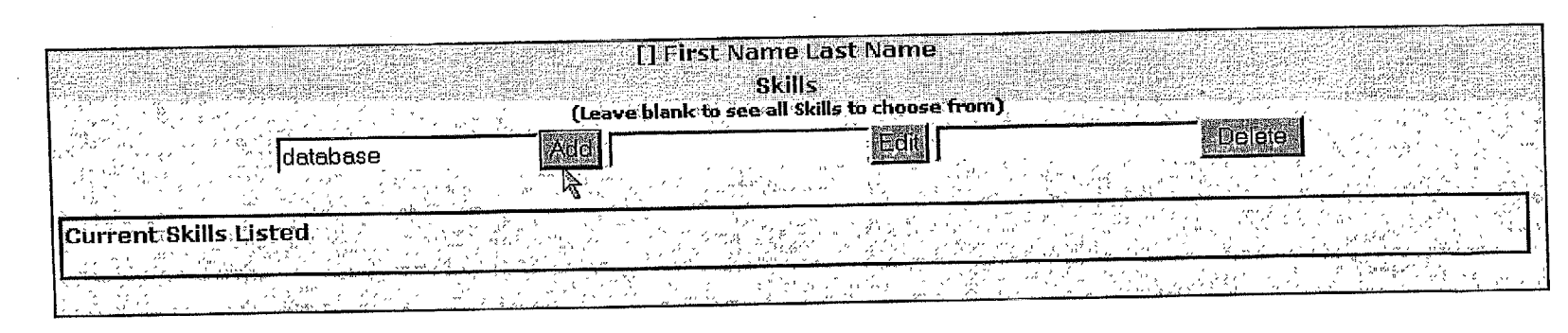
Figure 2D:
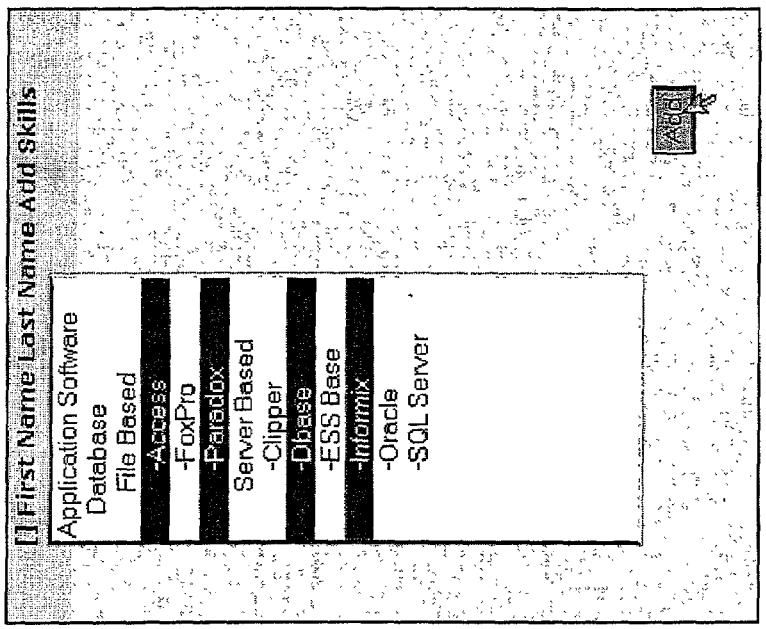
Figure 2E:
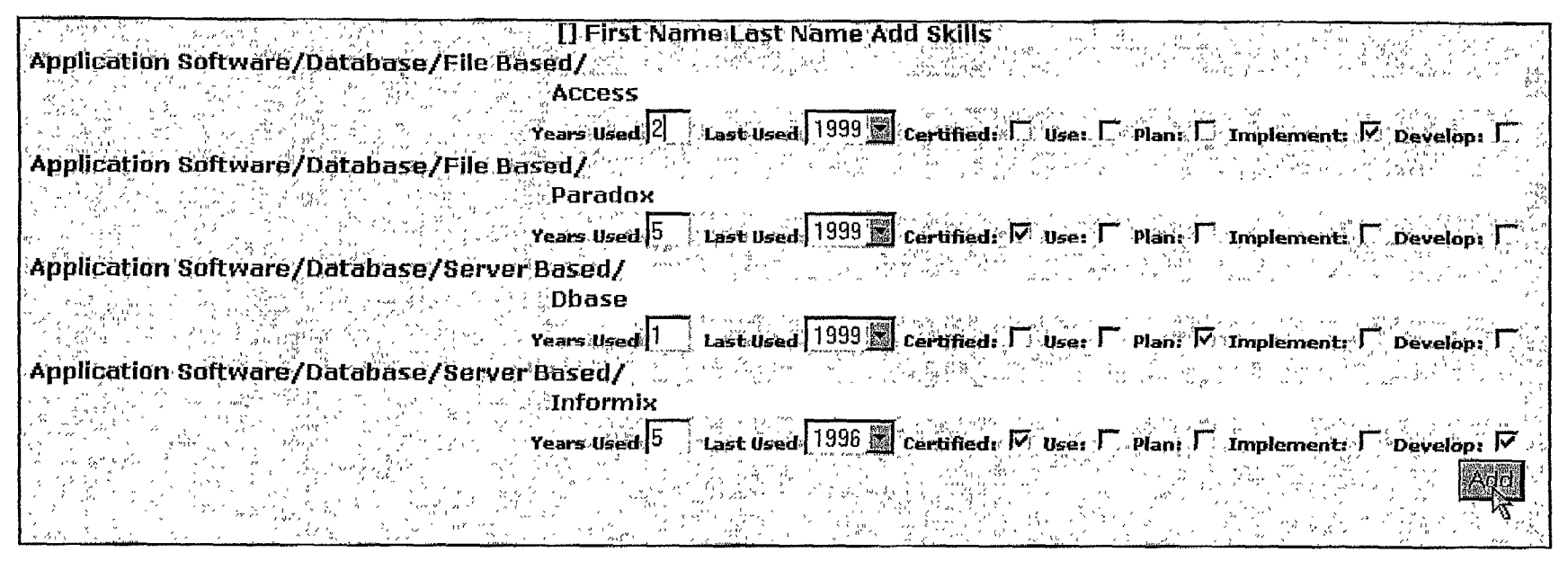

A prospect, i.e. an individual desiring to enter his/her Intellectual Capital into the system of the present invention, and/or look for matching job openings, may enter skills into Data Source 6 using a series of HTML forms, as described above, through User Interface 8 and will have the ability to retrieve from Data Source 6 all of the job positions that fit those skills. Examples of such forms are shown in FIGS. 2(*a*)–(*e*).

After receiving a request from the prospect, Data Source Interface 5 conducts a comparison of the set of submitted skills with the relevant information in Data Source 6 (e.g. job positions) using the hierarchical set of Intellectual Capital Codes described above. By using the hierarchical Intellectual Capital codes to match information, the system of the present invention provides significant benefits over the systems of the prior art, including increased efficiency and accuracy in matching a request (e.g. for job positions) with items stored in the knowledge base.

Figure 3B:
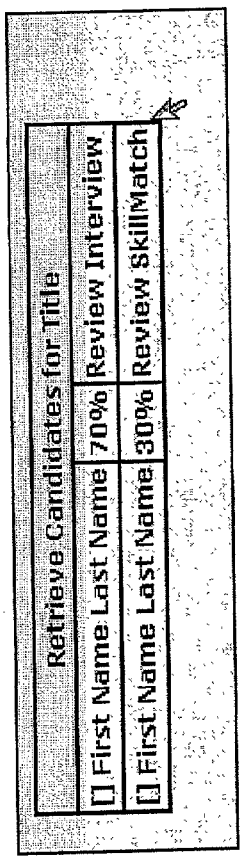

Data Source Interface 5 may then return a set of results to the prospect through User Interface 8. The results screen sent back by Data Source Interface 5 will display by percentage of match the jobs that the prospect might be interested in. An example of such results screens are shown in FIGS. 3(*a*)–(*c*).

By clicking on one of the results contained therein, the prospect may then retrieve a detailed report from Data Source Interface 5 of the skills required for the position, which skills match his/her profile, and which skills don't. The prospect will have the option at this time to update his/her skill set, if necessary, this updated information is stored in Data Source 6 using the hierarchical set of Intellectual Capital codes discussed above. The prospect will also have the option to submit his/her interest in that position to a recruiter via email, or similar messaging systems well known to those of skill in the art.

The recruiter would then receive an email message from Web Server 4 or Data Source Interface 5 through Email Server 7 in a conventional manner with all the pertinent information needed to contact the prospect. The prospect also has the ability to edit their own Intellectual Capital codes in Data Source 6 through the use of a unique username and password.

A client, e.g. an employer using a recruiter that participates in the system of the present invention and looking for job candidates, submits their position information in a similar manner and receives a similar results page from Data Source Interface 5. The results from Data Source Interface 5 will display by percentage the prospects that match the job by Intellectual Capital Codes—all personal information for the candidate stored in Data Source 6 may be left out. By clicking one of the results, the client can see exactly what skills the prospect has and what skills match. The client will have the ability to edit the position skills, adding or deleting skills as needed. The client will also have the option of submitting a prospect information request to the responsible recruiter—using email for example.

Each recruiter has control over prospects and clients they are assigned to. They can enter/update in Data Source 6 information about both prospects and clients, and can perform any of the tasks described above. The recruiter can also start the interview process during any phase by clicking an appropriate link provided on their HTML forms. This will retrieve a screen from Data Source 5 that will allow the recruiter to send a resume to any of the contacts listed in with a matching client's information. A recruiter's access may be limited to clients, prospects and interviews that are assigned to them, and, in this situation, a recruiter can only add clients, prospects, positions and the interviews that go with them.

The system manager has control over all aspects of the "Web site" (the combination of Web Server 4, Data Interface 5, and Data Source 6) including adding and deleting recruiters from the system and viewing recruiter activity reports. The manager has total control over all clients and prospects, and has total editorial control over all interview entries. In a preferred embodiment of the invention, the manager can only add recruiters, clients, prospects and interviews.

The system administrator is responsible for the technical administration of the system and preferably has total unrestricted control over all users of Web Site.

The client recruiter (i.e. a recruiter working for a client), managers, and administrators all have control of the "interview process." Taking this ability away from prospect recruiters provides the significant advantage that it allows for a more controlled process, and provides for responsibility in the interview process.

The interview process controls the flow of the interview status between the prospect and the client when the prospect is submitted for a position. Using, for example, a set of dropdown boxes on an HTML form to select the prospect and client, the recruiter can send the prospect's resume to the client through the use of the aforementioned Web site. Once the entry has been made, Data Source Interface 5 creates a record in Data Source 6 that will track the process. The preferred default phases are: Send Resume, Initial Interview, 2nd Interview, Tech Interview, Face to Face, Offer, Offer Accepted, Offer Rejected, Start At Work, Other, and Delete. The particular names and order of the phases can be changed by the administrator through the set up screen, and are not limited thereto.

During each phase, the client recruiter can choose to send out a preformatted email that informs each party involved of the action that took place. For example, if an Initial Interview was set by the client recruiter, an email can be sent automatically by the system containing all of the information needed to carry on that interview: phone numbers, times, names of everyone involved. These emails can be configured by the administrator through the setup screen or left at program defaults. They are then generated dynamically by the system and sent at the appropriate time.

Preferably, only the client recruiter (and managers and administrators) can edit an interview. This is to ensure the client recruiter is in total control of the interview process.

The ownership of a client or prospect may determined during login to the system of the present invention through Document Viewer 1, when a cookie file (well known to those in the art) is placed on Personal Computer 2, or other identification methods (also well known to those in the art) that will identify the user to the system. Ownership of clients and prospects is defined in Data Source 6. Managers and administrators are preferably the only users that can change ownership, as this will enforce the integrity of the information.

Initially, an organization using the system of the present invention will preferably determine the nature of Intellectual Capital that they desire based on a target market, i.e., Oracle, J.D. Edwards, etc. Each Data Source 6 in each such system of the present invention may be populated with skills and Intellectual Capital Codes from the Central Repository 9 (described above) based on the appropriate Intellectual Capital catalog needed, and will be oriented towards the user based on the job or project in question.

For example, in an embodiment of the present invention used by an organization in the Information Technology (IT) sector, Data Source 6 would be populated only with Intellectual Capital code information related thereto, excluding other industries and business sectors. The administrator will populate Data Source 6 with the information on each recruiter associated with the organization. Each recruiter using that system will then be able to input clients, prospects, and positions.

Both clients and prospects will be able to remotely enter their starting information on the Web site without recruiter intervention, however after that preferably the recruiter will control their entries. Clients will preferably have a password to allow them to submit new positions. The recruiter will be notified by email and they will make the final decision whether the job is approved or deleted.

Once positions and prospects are entered into the database, the recruiter will be able to match them using the Intellectual Capital codes. This matching can generate both the position choices for the prospect, as well as the prospect choices for the position based on the predefined Intellectual Capital codes built into the portion of Central Repository 9 included in Data Source 6. This is preferably a weighted match using a weighted Intellectual Capital code (as described above). From this screen, the recruiter will be able to initiate the Interview Process.

The recruiter, upon finding a match sufficient to fulfill the skills requirements for a position, will then begin the Interview Process by submitting a resume to the client. The Interview Process will be controlled and monitored from within that portion of the Web site, providing a consistent method to follow and ensure communication is maintained. The organization will have the ability to measure performance and monitor progress through a series of reports available to them from the information stored in Data Source 6.

Although this invention has been described with reference to particular embodiments, it will be appreciated that many variations may be resorted to without departing from the spirit and scope of this invention. For example, the user interface, data source interface, and data source of the present invention may comprise a single software application, and may be operated from a single computer or a network of computers via the Internet or an internal intranet. Moreover, for example, a network of personal computers may be used, a mainframe system, or a server and peripheral thin clients.

We claim:

1. A method for cataloging skills comprising the steps of:
   establishing a hierarchical list of defined skills;
   assigning an alphanumeric symbol to each of said defined skills to create an Intellectual Capital code for said defined skills, said Intellectual capital code comprising a series of one or more said alphanumeric symbols assigned to said defined skills to correspond to said hierarchical list of defined skills;
   receiving a set of submitted skills using a machine, wherein said set of submitted skills contains at least one of said defined skills in said hierarchical list;
   identifying said Intellectual Capital code corresponding to said defined skill in said set of submitted skills;
   adding at least one weighting factor to at least one of said Intellectual Capital codes in said set of submitted skills, said weighting factor having a characteristic that allows it to be used to match and rank at least a portion of said submitted skills; and
   storing at least said identified Intellectual Capital codes and said weighting factor in a machine-readable data source.

2. The method of claim 1, wherein said set of submitted skills comprises one or more selected from the group consisting of an individual skills inventory and a position requirement set for a job position.

3. The method of claim 1, wherein said hierarchical list comprises one or more levels selected from the group consisting of: (1) Class (2) Knowledge Group (3) Skill Group (4) Skill Set (5) Skills.

4. The method of claim 1, wherein said hierarchical list of defined skills and Intellectual Capital codes stored in a central repository remote from said machine-readable data source.

5. The method of claim 2, further comprising the steps of: comparing at least one of said Intellectual Capital codes in at least one of said position requirement sets to at least one of said Intellectual Capital codes in at least one of said individual skills inventories; and selecting at least one of individual or job position based upon said comparison.

6. The method of claim 5, further comprising the steps of: preparing a comparison report based upon said comparison; wherein said comparison report contains at least one value based upon the comparison of said position requirement set and said individual skills inventory and said information about said skills of said individual.

7. The method of claim 1, wherein said weighting factor is based upon one or more selected from the group consisting of "Last Year Used", "Number of Years Used as User", "Number of Years Used as Planner", "Number of Years Used as Developer", as"Number of Years Used as Implementer" and"Number of Years Used as Certified".

8. The method of claim 6, wherein said weighting factor includes a MUST, PLUS, or ANY identifier and said value in said comparison report is based upon said MUST, PLUS or ANY identifier.

9. The method of claim 1, further comprising the steps of: assigning a monetary value to at least one of said Intellectual Capital codes; storing said monetary value in said machine-readable data source; and computing a value for said skill set based upon said monetary value assigned to said Intellectual Capital code.

10. The method of claim 2, further comprising the step of storing additional identifying information for at least one of said individuals or at least one of said job positions in said machine-readable data source.

11. The method of claim 10, wherein additional information includes one or more selected from the group consisting of contact information, relocation, travel, training, and education.

12. The method of claim 1, wherein said alphanumeric symbol is selected from the group consisting of binary, octal, decimal, and hexadecimal.

13. The method of claim 1, wherein said machine-readable data source is accessed over the Internet.

14. The method of claim 1, wherein said machine-readable data source is accessed using one or more selected from the group consisting of drill down forms, search forms, and keyword searches; word aliases; and natural language queries.

15. The method of claim 5, wherein said machine-readable data source may be accessed by one or more users selected from the group consisting of said individual, a client, a recruiter, a system manager, and a system administrator.

16. The method of claim 15, further comprising the step of communicating interest in at least one of said individuals or at least one of said job positions to said recruiter.

17. The method of claim 15, further comprising the step of sending at least a portion of said selected individual's skills to said client to initiate an interview process.

18. The method of claim 17, further comprising the step of scheduling and tracking said interview process between said individual and said client.

19. The method of claim 17, wherein said interview process comprises one or more steps selected from the group consisting of: (1) Send Resume (2) Initial Interview (3) 2nd Interview (4) Tech Interview (5) Face to Face (6) Offer (7) Offer Accepted (8) Offer Rejected (9) Start At Work (10) Other (11) Delete.

20. The method of claim 17, wherein said recruiters communicates information related to said interview process between said individual and said client.

21. The method of claim 16, wherein said communication is conducted using electronic mail.

22. The method of claim 1, wherein at least two of said submitted skills are skill bound to each other.

23. A computer-accessible medium containing a computer program for cataloging skills, said computer program being programmed to:
establish a hierarchical list of defined skills;
assign an alphanumeric symbol to each of said defined skills to create an Intellectual Capital code for said defined skill, said Intellectual capital code comprising a series of one or more said alphanumeric symbols assigned to said defined skills to correspond to said hierarchical list of defined skills;
receive a set of submitted skills, wherein said set of submitted skills contains at least one of said defined skills in said hierarchaical list;
identify said Intellectual Capital code corresponding to saod defined skill in said set of submitted skills;
add at least ine weighting factor t oat least one of said Intellectual Capital codes in said set of submitted skills; and
store at least said identified Intellectual Capital codes and said weighting factor in a data source.

24. The computer program of claim 23, wherein said set of submitted skills comprises one or more selected from the group consisting of an individual skills inventory and a position requirement set for a job position.

25. The computer program of claim 23, wherein said hierarchical list comprises one or more levels selected from the group consisting of: (1) Class (2) Knowledge Group (3) Skill Group (4) Skill Set (5) Skills.

26. The computer program of claim 23, wherein said hierarchical list of defined skills and Intellectual Capital codes stored in a central repository remote from said data source.

27. The computer program of claim 24, further being programmed to: compare at least one of said Intellectual Capital codes in at least one of said position requirement sets to at least one of said Intellectual Capital codes in at least one of said individual skills inventories; and select at least one of individual or job position based upon said comparison.

28. The computer program of claim 27, further being programmed to: prepare a comparison report based upon said comparison; wherein said comparison report contains at least one value based upon the comparison of said position requirement set and said individual skills inventory and said information about said skills of said individual.

29. The computer program of claim 23, wherein said weighting factor is based upon one or more selected from the group consisting of"Last Year Used", "Number of Years Used as User", "Number of Years Used as Planner", "Number of Years Used as Developer", as "Number of Years Used as Implementer" and "Number of Years Used as Certified".

30. The computer program of claim 28, wherein said weighting factor includes a MUST, PLUS, or ANY identifier and said value in said comparison report is based upon said MUST, PLUS or ANY identifier.

31. The computer program of claim 23, further being programmed to: assign a monetary value to at least one of said Intellectual Capital codes; store said monetary value in said data source; and compute a value for said skill set based upon said monetary value assigned to said Intellectual Capital code.

32. The computer program of claim 24, further being programmed to store additional identifying information for at least one of said individuals or at least one of said job positions in said data source.

33. The computer program of claim 32, wherein additional information includes one or more selected from the group consisting of contact information, relocation, travel, training, and education.

34. The computer program of claim 23, wherein said alphanumeric symbol is selected from the group consisting of binary, octal, decimal, and hexadecimal.

35. The computer program of claim 23, wherein said data source is accessed over the Internet.

36. The computer program of claim 23, wherein said data source is accessed using one or more selected from the group consisting of drill down forms, search forms, and keyword searches; word aliases; and natural language queries.

37. The computer program of claim 27, wherein said data source may be accessed by one or more users selected from the group consisting of said individual, a client, a recruiter, a system manager, and a system administrator.

38. The computer program of claim 37, further being programmed to communicate interest in at least one of said individuals or at least one of said job positions to said recruiter.

39. The computer program of claim 37, further being programmed to send at least a portion of said selected individual's skills to said client to initiate an interview process.

40. The computer program of claim 39, further comprising the step of scheduling and tracking said interview process between said individual and said client.

41. The computer program of claim 39, wherein said interview process comprises one or more steps selected from the group consisting of: (1) Send Resume (2) Initial Interview (3) 2nd Interview (4) Tech Interview (5) Face to Face (6) Offer (7) Offer Accepted (8) Offer Rejected (9) Start At Work (10) Other (11) Delete.

42. The computer program of claim 39, wherein said recruiters communicates information related to said interview process between said individual and said client.

43. The computer program of claim 38, wherein said communication is conducted using electronic mail.

44. The computer program of claim 23, wherein at least two of said submitted skills are skill bound to each other.

* * * * *